Figure 1:
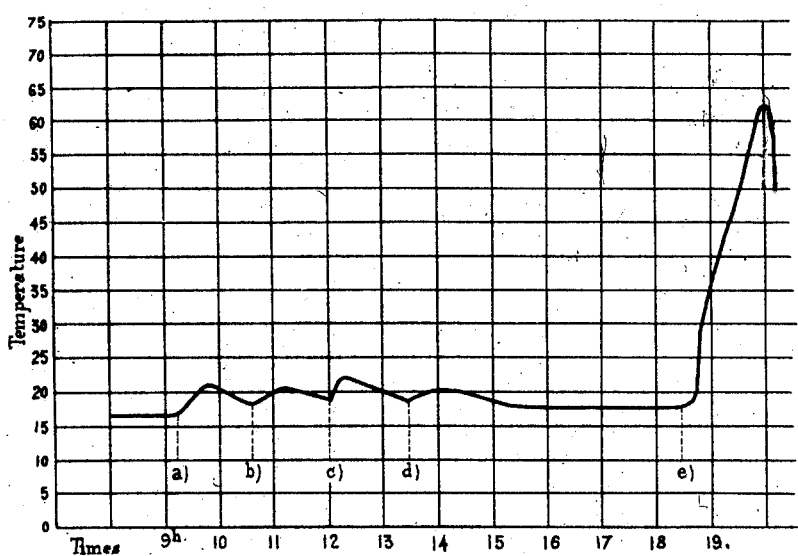

May 1, 1928.

H. L. BARTHÉLEMY

ESTERIFICATION OF CELLULOSE

Filed Jan. 27, 1928

1,668,484

3 Sheets-Sheet 1

INVENTOR:
Henri Louis Barthélemy
By Alexander T Dowell
ATTORNEYS

May 1, 1928.

H. L. BARTHÉLEMY 1,668,484

ESTERIFICATION OF CELLULOSE

Filed Jan. 27, 1928

3 Sheets-Sheet 3

INVENTOR:
Henri Louis Barthélemy
By Alexander & Dowell
ATTORNEYS:

Patented May 1, 1928.

1,668,484

UNITED STATES PATENT OFFICE.

HENRI LOUIS BARTHÉLEMY, OF VERCELLI, ITALY, ASSIGNOR TO RUTH ALDO COMPANY INC., OF NEW YORK, N. Y., A CORPORATION OF NEW YORK.

ESTERIFICATION OF CELLULOSE.

Application filed January 27, 1928, Serial No. 249,988, and in France December 29, 1927.

The object of the present invention is a new process of manufacturing cellulose esters, particularly acetyl-celluloses. The raw material may consist of wood cellulose or of cotton which may (or not) have been transformed beforehand by a special process such as:—

(a) An oxidation process according to the known practice, or preferably according to the United States patent application No. 209,167 filed on the 28th July, 1927, for an "Improvement in processes for the esterification of cellulose;"

(b) A softening process according, for example, to the first part of the United States patent application No. 209,161 filed on the 28th July, 1927, for a "Process for the homogeneous esterification of cellulose," or according to the United States patent application filed this day in the name of the said applicant, for a "Process for softening fibres of cellulose origin, with a view to facilitating their esterification;"

(c) A process of preliminary and partial esterification by a mineral or organic acid, such as nitric acid or formic acid;

(d) A process of preliminary and partial etherification by an alcohol, such as benzyl alcohol or ethyl alcohol.

Up to the present, the esterification of cellulose—previously subjected, or not, to one of these preliminary treatments—has been effected by the action of acetic anhydride and of a catalyzer such as sulphuric acid, in the presence of a diluent usually consisting of acetic acid. The various processes employed may be classed as follows:

I. The cellulose is introduced into the whole of the acetylating bath, consisting of a mixture of the anhydride, acetic acid and catalyzer, with or without a solvent such as benzol.

This method of procedure is disclosed in the French Patents No. 368,738 of 20th June, 1906; No. 458,263 of 22nd May, 1913; No. 449,253 of 28th August, 1912; No. 523,738 of 9th October, 1920; and 505,608 of 31st October, 1909, and in the German Patents No. 184,201 of 2nd October, 1904; No. 252,706 of 30th September, 1905; and No. 269,193 of 28th December, 1909.

II. The cellulose is steeped in acetic acid and is then immersed into the whole of the anhydride and catalyzer, with or without the presence of a solvent such as benzol. This is the process of the United States Patent No. 1,236,578 of 14th August, 1917.

III. The cellulose is hydrolyzed in the whole of the acetic acid and catalyzer, the whole of the anhydride being then added, with or without the addition of a solvent such as bezol. This method of operating is in accordance with the United States Patents, No. 1,236,579 of 14th August, 1917 and 845,374 of 26th February, 1907; the French Patents No. 319,948 of 22nd March, 1902, 458,079 of 27th September, 1905 and 565,654 of 30th April, 1923; and the German Patent No. 163,316 of 9th October, 1905.

IV. The cellulose is hydrolyzed beforehand in the whole of the acetic acid and the catalyzer, in the presence of a small amount of acetic anhydride. The acetic anhydride is added afterwards. This method is in accordance with the French Patents No. 473,399 of 12th June, 1914 and No. 478,436 of 4th August, 1914.

V. The cellulose is entered into the whole of the acid, with addition of the acetic anhydride. The catalyzer is then added, all at once or in several portions, as in the following patents: French Patent No. 494,832 of 24th May, 1917, and Swiss Patent No. 120,810 of 28th September, 1925.

VI. The cellulose is subjected to a continuous series of partial esterifications, all of which are characterized by a series of successive additions of suitable quantities of the acetylating agent, such additions being deferred until the state of equilibrium corresponding to the fresh addition which has brought about the change of concentration has been established. The catalyzer is added at the same time as the first portion of the acetic anhydride. In this patent application insistence is laid on the fact that the manner in which the various acetylation agents are caused to act on the cellulose is not without its effect on the intrinsic value of the final product.

The fact is that esterification of cellulose or its derivatives is not at once a system of reaction in homogeneous equilibrium, the mono- and di-acetates formed at first being, indeed, insoluble in the acetylating medium. Moreover, seeing that the acetylation is a very highly exothermic reaction, the homogeneity of the final product depends, for the most part, on the skill with which the acetylation is performed, that is, the skill with which local rises in temperature are prevented. These rises occur all the more readily at the commencement of the esterification, because the cotton remains a bad conductor of heat until it has become thoroughly soaked.

Applicant has ascertained—and this is the subject of the present invention—that the reaction can be very easily controlled, and at the same time cellulose acetates which are completely homogeneous in respect of optical, mechanical and plastic properties can be obtained, by employing the new and original working method hereinafter described.

This working method consists in adding to the cellulose a succession of complete acetylation baths (that is to say baths containing the catalyzer, the acetic anhydride and the diluent, such as acetic acid) in such a manner that the heat of the reaction is readily dissipated, mainly during the formation of the cellulose mono- and diacetates, this being done without the necessity of resorting to a preliminary hydrolysis. The operation is considerably facilitated by the fact that the cotton is softened prior to acetylation (in the manner specified in the United States patent application filed this day, in the name of the applicant, for a "Process for softening fibres of cellulose origin with a view to facilitating their esterification").

In bringing about a succession of conditions of chemical equilibrium which, while differing slightly from one another, are nevertheless sufficiently removed for the rises in temperature not to exceed 5 or 6° C., so long as the amount of the acetyl radicles combined has not reached 25%, the heat of the reaction is perfectly subdivided and absorbed; and, moreover, the acetylation proceeds slowly and in a completely homogeneous and progressive manner throughout the whole mass, without any danger of any parts being too far advanced or lagging behind.

As the reaction is bimolecular, it is conceivable that, with a succession of baths of different composition and employed at sufficient intervals of time, it is mathematically possible to control the acetylation so that it passes through a series of values, determined by the experimental conditions, and to dissipate with ease the amount of heat units liberated by the esterification, said heat units being determined by the composition of the various acetylating baths.

Each state of equilibrium of the system is regulated, in perfect harmony with each bath by the Gülberg and de Waage law.

According to the invention, the catalyzer employed is sulphuric acid, either alone or in association with agents, such as the halogens, which modify cellulose, or again with oxidizing agents as prescribed in the United States patent application No. 209,166 filed 28th July, 1927, for a "Process for the manufacture of cellulose esters." In the composition of the different baths the amount of sulphuric acid employed is progressively increased; and that, too, at the commencement of the esterification; because applicant has recognized that the fact of esterifying the cellulose progressively enables it to stand progressively increasing amounts of the catalyzer. At the outset, the operation is conducted with very small amounts of sulphuric acid, associated preferably with halogens. This association should preferably occur in the first stages of esterification, before the acetyl content exceeds about 10%. The fact of the halogens being employed in direct association enables a considerable reduction to be effected in the quantity of the sulphuric acid which, as is known, causes the formation of cellulose sulphates, the stability of which is mediocre, and which make the acetates difficult to store.

Although the catalytic action of the halogens is known, it has never yet been utilized in this manner, in admixture with sulphuric acid in the first phase of the operation. The method of employing chlorine described in the French Patent No. 505,608 of 31st October, 1919, for example, places the operator under the necessity of artificially raising the reaction mass to elevated temperatures, attaining 70–80° C., which may have serious consequences. On the other hand, the association of the catalyzers enables the operation to be conducted with temperatures of 16–25° C. for the heat of reaction.

In the process forming the subject of the present invention, the range of temperatures is clearly restricted, the experiments of the applicant having demonstrated that the rate of fixation of the acetyl radicles on the cellulose complex already partially acetylated must only be increased very gradually, failing which the products obtained may differ totally in character. A whole series of experiments have convinced the applicant that two partially acetylated celluloses will exhibit a notable difference in the rate and intensity of acetylation during their successive periods of esterification if they were not, at the outset, in the same condition of richness in acetyl groups and were not at the same temperature. The accuracy of this observation persists even when the said partial initial acetylation has been effected in the same bath and at the same temperature.

In the process according to this invention, the temperature of the reaction is limited to between 18 and 26° during the preparation of the cellulose acetates with an acetyl content between 0 and 11.70% (monoacetate in C 12). In the preparation of the di-, tri- and up to the tetracetate of cellulose, the temperature is preferably maintained between 20 and 35°. Finally, in order ultimately to obtain the penta- and hexacetates of cellulose without being obliged to employ too great an excess of acetic anhydride, the temperature may be allowed to rise, without inconvenience, to 55–65° C. This elevation of the temperature is then no longer attended with any danger to the cellulose complex, which is already in an advanced and uniform stage of acetylation which protects it from the rough action of the catalyzers.

These different results are obtained by a series of additions, in so to speak elementary quantities. The composition of these additions, and the amount and number of each, are calculated as herein set forth. There is nothing similar existing in the literature. The British Patent No. 190,732 of 20th June, 1921, comprises only two phases of acetylation, whereas applicant's process, on the contrary, comprises a minimum of four phases, as will be shown in the subsequent example; but, in practice, their number may be far greater. Moreover, whereas the first phase of the process described in the British Patent No. 190,732 is carried through without any condensing agent, and at temperatures which may attain 90–100°, the first phases of the present process are carried out in presence, conjointly, of sulphuric acid and an auxiliary catalyzer such as a halogen-chlorine, bromine or iodine. The range of temperature lies between 18 and 26° C.

The present process also differs from the process of the previously mentioned French Patent No. 473,399 of 12th June, 1914, in that the said latter process also comprises only two distinct phases. Furthermore, the condensing agent is added solely in the first phase and consists only of sulphuric acid, or of methylene sulphate, as in the French Patent No. 478,436 of 4th August, 1914, its chief purpose being to effect the hydrolysis of the cellulose, as specified in the résumé. The next bath is composed solely of acetic anhydride; whereas in the process now described each of the baths is complete, that is to say, contains acetic anhydride, the catalyzer and a larger or smaller amount of acetic acid, serving as diluent in preference to benzol and carbon tetrachloride, which lead to the formation of acetylcelluloses with a morphological structure identical with cotton.

Two examples of the method of procedure devised by applicant will now be given, merely by way of explanation and not restriction. These examples are illustrated by graphs of the temperatures recorded in the course of each of the various phases (see Figs. 1 and 2 of the accompanying drawing).

Figure 2:
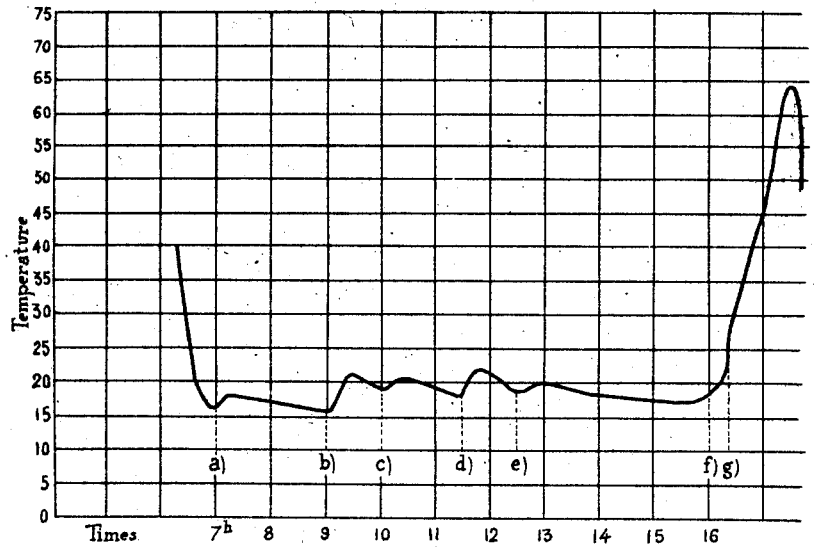

In Figs. 1 and 2, the abscissas denote the times at which the additions were given, and the ordinates represent the temperatures.

This will show the manner in which the various successive acetylations are conducted, and how the amounts of heat disengaged in the course of the reaction are balanced with a view to contributing to the final result, which is a cellulose acetate having the maximum of optical, mechanical and plastic homogeneity.

Figure 3:
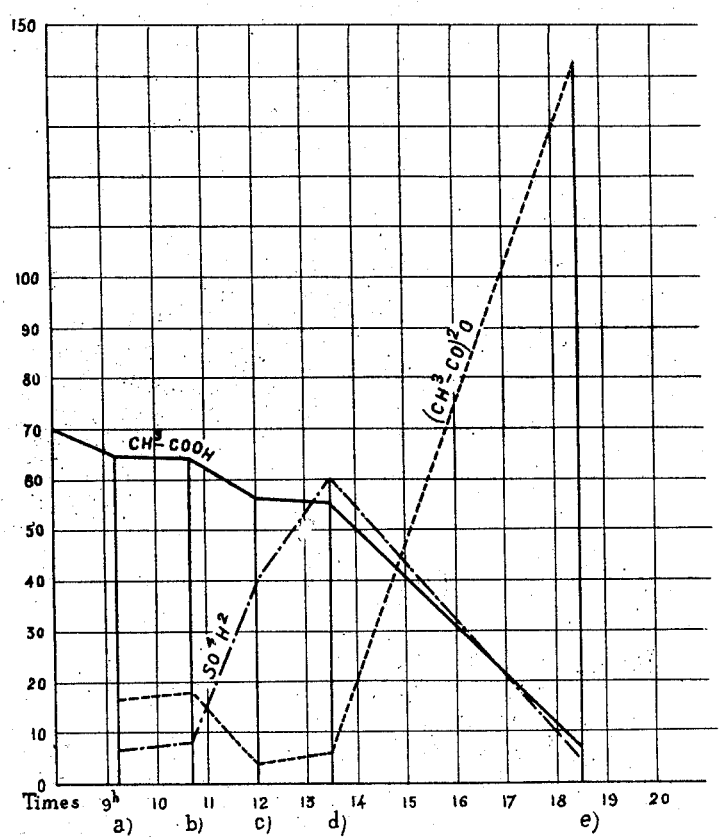
Figure 4:
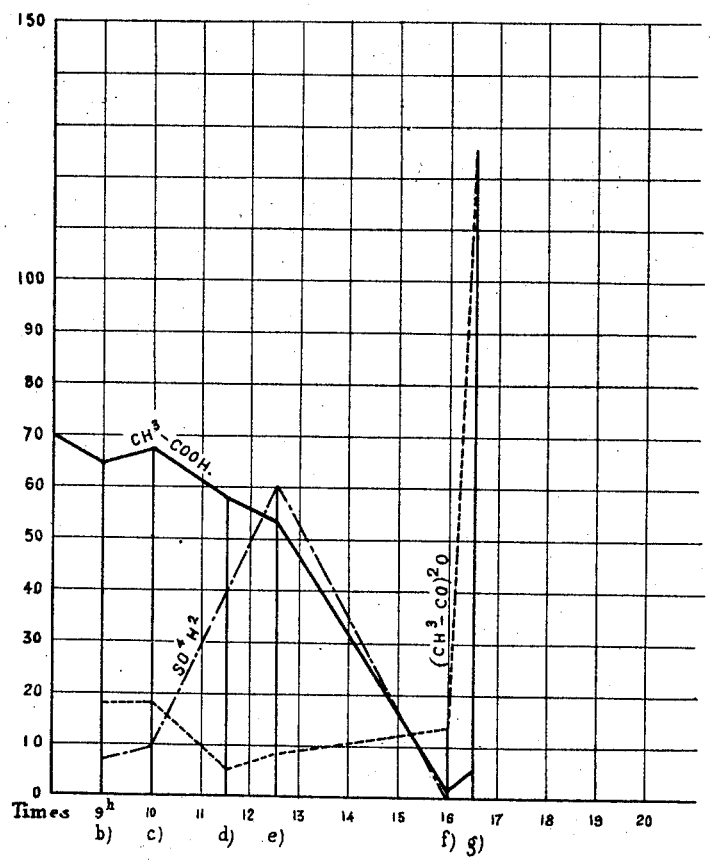

The relative proportions of the various reagents are summarized in the graphs Fig. 3 and Fig. 4, respectively relating to Example I and Example II. These graphs represent the relative amounts of anhydride, acetic acid and sulphuric acid of which each bath is composed, at the times at which the additions are made. The abscissas denote the times corresponding to the graph of the recording apparatus, and the ordinates the amounts of acid or anhydride, expressed in litres, and the sulphuric acid in cubic centimetres.

*Example I.*

70 kilograms of dry, boiled cotton are treated by the primitive softening process referred to at the beginning, said process consisting in vaporizing throughout the mass 70 kg. of 99% acetic acid supplied by an auxiliary boiler. The temperature is allowed to return to 16.5° C., and at that moment—that is to say at 9.15 of the graph No. 1 of the recording apparatus—the succeeding bath (a) is poured on to the cotton, which is maintained in agitation in an apparatus of the Werner mixer type, the Grignard type, or preferably in an apparatus of the type described in the applicant's United State patent application No. 209,164 filed on 28th July, 1927, for "Improvement in apparatus for the acetylation of cellulose." The bath (a) has the following composition:—

(a) Glacial acetic acid_____ 65 litres.
    Acetic anhydride (93%)_ 17 litres.
    Bromine_____ 0.020 kilograms.
    Sulphuric acid (95.5%)__ 0.070 litres.

A primary acetylation speedily occurs, characterized by a progressive rise in temperature to 21° C., despite the external cooling applied.

When equilibrium has been restored, it is found that this reaction is restricted to the formation of an acetate with the acetyl value 0.95%.

At 10.40 the second acetylating bath is added, of the following composition:—

(b) Acetic acid (crystallizable)___ 64 litres.
    Acetic anhydride (93%)_____ 18 litres.
    Bromine_____ 0.018 kilos.
    Sulphuric acid (95.5%)_____ 0.090 litres.

This new acetylation is characterized by a fresh rise in temperature, and by the production of a more highly acetylated acetate than the previous one, the acetyl value being 1.47% after equilibrium has been restored.

At 12.00, the next bath is added, which does not contain any halogen, and has the composition:—

(c) Acetic acid (crystallizable) ---- 57 litres.
    Acetic anhydride (93%) ------ 4 litres.
    Sulphuric acid (95.5%) ------ 0.400 litres.

The temperature again rises, but not above 23°. When equilibrium is once more restored by the masses present, the acetyl value is 7%; and at the same time a uniform modification of the optical properties of the fibre, when viewed by polarized light, begins to be manifest.

At 13.30 the following fourth bath is added, containing a larger amount of sulphuric acid:—

(d) Glacial acetic acid ---------- 55 litres.
    Acetic anhydride (93%) ------ 6 litres.
    Sulphuric acid (95.5%) ------ 0.600 litres.

The ensuing rise in temperature is noticeably smaller, in spite of the increase in the amount of catalyzer, thus clearly showing the protection afforded to the fibre by the preceding acetylations. On equilibrium being restored, at the temperature 19–21° it is found that the new reaction has been restricted to the production of an acetate with 11.5–16% of acetyl; that is to say, approximating to the monoacetate in C 12.

At 18.30 a fifth bath is added, composed of:—

(e) Glacial acetic acid ---------- 7 litres.
    Acetic anhydride (93%) ---- 143 litres.
    Sulphuric acid (95.5%) ------ 0.050 litres.

At this moment the reaction is preferably conducted in two stages. At first the temperature is allowed to rise spontaneously during 25–40 minutes, without external cooling, so that the reaction mass has the temperature 25–28° C., whereby the reaction is restricted to the production of a cellulose acetate with 25–28% of acetyl. This acid swells up considerably and uniformly in the re-agents and is ready to enter into solution.

At 19.00 the reaction is terminated by the application of external heat so as to raise the temperature to 60–65° (exactly 62° in Fig. 1).

At 20.00 a remarkably limpid and refractive acetic collodion is obtained, a sample of which, on precipitation in water, washing and drying, shows 45.3% of acetyl, corresponding approximately to the hexacetyl-cellulose in C 12.

The acetic sol can be precipitated in water, after filtration. It may be treated in situ, or in any other suitable apparatus, by the known methods of saponification, such as those described in the United States Patent No. 838,850 of 23rd November, 1904, or preferably by the process specified by the present applicant in his United States patent application No. 209,162 filed 28th July, 1927, for a "Process of manufacturing cellulose esters."

*Example II.*

70 kilograms of dry, bleached cotton, previously subjected to the action of a small amount of free chlorine and then to the vapors of 14 kg. of 99.4% acetic acid, furnished by a small auxiliary boiler, according to the process described in the United States patent application, filed January 27th, 1928, for a "Process for softening fibres of cellulose origin with a view to facilitating their esterification," Serial No. 249,987 are further treated by a first bath of the following composition:—

(a) Glacial acetic acid ------ 56 litres.
    Bromine (dissolved and
      uncombined) ---------- 0.056 kilograms.

the object of this bath being to further increase the softening (cuticular and protoplasmic) of the cellulose.

At 9.00 of the graph (Fig. 2), the following bath is introduced, by suitable pouring means, the cotton being kept in agitation by mechanical means:—

(b) Glacial acetic acid ------ 65 litres.
    Acetic anhydride (93%) - 18 litres.
    Bromine ---------------- 0.018 kilograms.
    Sulphuric acid (95.5%) -- 0.070 litres.

As in Example I, this acetylation is characterized by a rise in temperature from 16 to 21° C., and by an acetate which, after chemical equilibrium has been established, shows 1.02% of acetyl.

At 10.00, the second acetylation bath is added, composed of:—

(c) Glacial acetic acid ------ 67 litres.
    Acetic anhydride (93%) - 18 litres.
    Chlorine, dissolved in the
      acid ------------------ 0.050 kilograms.
    Sulphuric acid (93%) ---- 0.095 litres.

This bath produces a further partial acetylation, characterized, after equilibrium has been restored, by 2.77% of acetyl.

At 11.30, the third acetylation bath is introduced, composed of:—

(d) Glacial acetic acid ---------- 58 litres.
    Acetic anhydride (93%) ------ 5 litres.
    Sulphuric acid (93%) -------- 0.400 litres.

This bath produces a fresh acetylation, more characteristic in respect of elevation of temperature, which rises from 19 to 22.5° in a quarter of an hour. After equilibrium is restored, the acetyl content is found to be 8.83%.

At 12.30, the fourth acetylation bath is added, having the following composition:—

(e) Glacial acetic acid ---------- 54 litres.
    Acetic anhydride (93%) ------ 8 litres.
    Sulphuric acid (95%) -------- 0.650 litres.

As before, despite the increased amount of catalyzer, the reaction is far less energetic, the temperature only rising from 19 to 20° C. At 15.30, after equilibrium has been restored, the new acetate is characterized by a content of 19.3% of acetyl. In polarized light it displays dark alternations like points of stricture in preparation.

It will be easily understood that the acetylation can be carried on by further stages in like manner; but the desirability, existing at the commencement of the operation, for such subdivision has become less because the cellulose acetate is now on the point of passing into solution under a slightly more extended acetylation. The essential point is to have attained homogeneity in the first acetates, to ensure the homogeneity of the final products.

At 16.00, the following, fifth acetylation bath is added to the mass:—

(f) Crystallizable acetic acid_____ 1 litre.
    Acetic anhydride (93%)_____ 14 litres.
    Sulphuric acid (95%)_____ 0.005 litres.

The temperature is allowed to rise spontaneously to 30°, which takes about 30 minutes, by dispensing with all external cooling. This fifth acetylation is characterized by the formation of a thick pulp of fibres, with the acetyl value 30.26%.

At 16.30, the following sixth and last bath is added:—

(g) Glacial acetic acid_____ 5 litres.
    Acetic anhydride (93%)____ 126 litres.
    Sulphuric acid (95%)_____ 0.050 litres.

and the apparatus is heated so as to raise the temperature to 60–65° (64° in graph 2). At 17.30 a thick acetic syrup is obtained, which is treated in the manner indicated in the previous example.

I claim:—

1. A process for the esterification of cellulose or its transformation products, consisting in subjecting the cellulose mass to a series of at least four successive partial acetylations each of which is deferred until the preceding one has terminated.

2. A process for the esterification of cellulose or its transformation products, consisting in subjecting the cellulose mass to the action of a halogen, and then to a series of successive partial acetylations.

3. A process for the homogeneous esterification of cellulose, consisting in effecting acetylation in a plurality of stages and in using for the first stages a mixed catalyzer composed of sulphuric acid in association with at least one halogen element.

4. A process for the homogeneous esterification of cellulose, consisting in effecting acetylation in a plurality of stages and in using for the first stages a mixed catalyzer composed of sulphuric acid in association with oxidizing agents.

5. A process for the esterification of cellulose or its transformation products, consisting in subjecting the cellulose mass to a series of at least four successive partial acetylation steps each of which is deferred until the preceding one has terminated and preventing increases of temperature exceeding 6° C. during at least the first two steps.

6. A process for the esterification of cellulose or its transformation products, consisting in subjecting the cellulose mass to the action of a halogen, and then to a series of successive partial acetylations, while preventing increases of temperature exceeding 6° C. during at least the first two partial acetylations.

7. A process for the esterification of cellulose or its transformation products, consisting in subjecting the cellulose mass to a series of successive partial acetylations each of which is deferred until the preceding one has terminated, and regulating the temperature of each partial acetylation in accordance with the desired extent of acetylation to be attained in such step.

8. A process for the esterification of cellulose or its transformation products, consisting in subjecting the cellulose mass to a series of successive partial acetylations each of which is deferred until the preceding one has terminated, and each of which is effected at a temperature depending on the extent of the acetylation desired to be attained during such step.

9. A process for the esterification of cellulose or its transformation products, consisting in subjecting the cellulose mass to the softening action of acetic acid; and then to a succession of acetylation baths, each performing part of the acetylation of the cellulose.

10. A process for the esterification of cellulose or its transformation products, consisting in subjecting the cellulose mass to the softening action of acetic acid; and then adding a succession of acetylation baths each producing a part of the acetylation of the cellulose and each containing sulphuric acid containing a catalyzer.

11. A process for the esterification of cellulose or its transformation products, consisting in subjecting the cellulose mass to the softening action of acetic acid; and then adding a succession of acetylation baths each producing a part of the acetylation of the cellulose, and each containing sulphuric acid as catalyzer.

12. A process for the esterification of cellulose or its transformation products, consisting in subjecting the cellulose mass to the softening action of acetic acid; and then to a succession of acetylation baths, each producing a part of the acetylation of the cellulose and containing progressively increasing amounts of sulphuric acid containing a catalyzer.

13. A process for the esterification of cellulose or its transformation products, consisting in subjecting the cellular mass to the softening action of acetic acid; and then to a succession of acetylation baths, each producing a part of the acetylation of the cellulose and containing progressively increasing amounts of sulphuric acid as catalyzer.

14. A process for the esterification of cellulose or its transformation products, consisting in subjecting the cellulose mass to the softening action of acetic acid; then to a succession of acetylation baths each producing a part of the acetylation of the cellulose and containing successively increasing amounts of sulphuric acid as catalyzer, and associating with the sulphuric acid in at least some of the baths a halogen.

15. A process for the homogeneous esterification of cellulose, consisting in effecting acetylation in a plurality of stages and in using for the first stages a mixed catalyzer containing sulphuric acid and at least one halogen element.

16. A process for the esterification of cellulose or its transformation products, consisting in subjecting the cellulose mass to a series of successive partial acetylation steps, each of which is deferred until the preceding one has terminated, and preventing increase of temperature above approximately 26° C. during all steps preceding the last one.

17. A process for the esterification of cellulose or its transformation products, consisting in subjecting the cellulose mass to a series of successive partial acetylation steps, each of which is deferred until the preceding one has terminated and preventing variations of temperature exceeding 6° C. and also increase of temperature above approximately 26° C. during all steps preceding the last.

18. A process for the esterification of cellulose or its transformation products, consisting in subjecting the cellulose mass to the action of a halogen; and then to a series of successive partial acetylations; and preventing increase of temperature above approximately 26° C. during all steps preceding the last one.

19. A process for the esterification of cellulose or its transformation products, consisting in subjecting the cellulose mass to the action of a halogen; and then to a series of successive partial acetylation steps; and preventing variation of temperature exceeding 6° C. and also increase of temperature above approximately 26° C. during all steps preceding the last.

20. A process for the esterification of cellulose or its transformation products, consisting in subjecting the cellulose mass to the softening action of acetic acid and a halogen; and then to a succession of acetylation baths each producing a part of the acetylation of the cellulose; and preventing increase of temperature above approximately 26° C. during all baths preceding the last one.

21. A process for the esterification of cellulose or its transformation products, consisting in subjecting the cellulose mass to the softening action of acetic acid and a halogen, and then to a succession of acetylation baths each producing a part of the acetylation of the cellulose, and preventing variation of temperature exceeding 6° C. and also increase of temperature above approximately 26° C. during all baths preceding the last.

22. A process for the esterification of cellulose or its transformation products, by a series of more than two successive partial acetylations effected by a successive addition of corresponding partial quantities of acetylation agents.

In testimony whereof I affix my signature.

HENRI LOUIS BARTHÉLEMY.